United States Patent
Xu et al.

(10) Patent No.: US 11,126,157 B1
(45) Date of Patent: Sep. 21, 2021

(54) HYBRID INTERNET OF THINGS EVALUATION FRAMEWORK

(71) Applicant: VMware, Inc., Palo Alto, CA (US)

(72) Inventors: Hui Xu, Palo Alto, CA (US); Jiajie Liang, Palo Alto, CA (US); Karen Brems, Redwood City, CA (US); Jong Ho Won, Palo Alto, CA (US)

(73) Assignee: VMWARE, INC., Palo Alto, CA (US)

(*) Notice: Subject to any disclaimer, the term of this patent is extended or adjusted under 35 U.S.C. 154(b) by 29 days.

(21) Appl. No.: 16/826,382

(22) Filed: Mar. 23, 2020

(51) Int. Cl.
 *H04L 12/28* (2006.01)
 *G05B 19/406* (2006.01)

(52) U.S. Cl.
 CPC .. *G05B 19/406* (2013.01); *G05B 2219/40452* (2013.01)

(58) Field of Classification Search
 CPC .................................................. H04L 12/2818
 USPC ........................................................ 700/275
 See application file for complete search history.

(56) References Cited

U.S. PATENT DOCUMENTS

| | | | |
|---|---|---|---|
| 2019/0007511 A1* | 1/2019 | Rodriguez | G08B 21/18 |
| 2019/0149429 A1* | 5/2019 | Stocker | H04L 67/104 |
| | | | 709/225 |
| 2019/0260831 A1* | 8/2019 | Milev | H04L 67/125 |
| 2019/0334764 A1* | 10/2019 | Chor | H04L 41/0654 |
| 2019/0349254 A1* | 11/2019 | Nolan | H04L 67/1093 |
| 2019/0349426 A1* | 11/2019 | Smith | G06F 16/1824 |
| 2020/0403871 A1* | 12/2020 | AbiEzzi | H04L 67/12 |

OTHER PUBLICATIONS

Omoniwa et al, Fog/Edge Computing-Based IoT (FECIoT): Architecture, Applications, and Research Issues, Jun. 2019, IEEE, p. 32 (Year: 2019).*

* cited by examiner

*Primary Examiner* — Suresh Suryawanshi
(74) *Attorney, Agent, or Firm* — Thomas Horstemeyer, LLP (57) ABSTRACT

Various examples are disclosed for hybrid alert and action solution in Internet-of-Things (IoT) networks. A multi-edge alert definition specifies a plurality of IoT devices that communicate through a plurality of edge devices. The multi-edge alert definition is registered in a fog evaluation service for evaluation. Data corresponding to the IoT devices is received by the fog evaluation service from the plurality of edge devices. An alert is triggered based on a condition specified in the multi-edge alert definition.

20 Claims, 5 Drawing Sheets

HYBRID INTERNET OF THINGS EVALUATION FRAMEWORK

BACKGROUND

The Internet-of-Things (IoT) refers to interrelated computing devices, sensors, and objects that are network-enabled such that they are periodically able to transfer data over a network. Some IoT architectures include three architectural layers, including a sensor layer, an edge system layer (also referred to as a "gateway layer"), and a server layer that may execute in a cloud hosted on the Internet. Notably, many IoT solutions evaluate data collected from end devices at a cloud server layer, where alerts are triggered, and actions are taken based on the data received from sensor devices.

There are many disadvantages for evaluating data, triggering alerts, performing event analysis, and determining actions at the off-premise server layer. For instance, high and unpredictable latency may occur when transferring data to the server and evaluating the data at the server. Additionally, network bandwidth demand is increased as all data and corresponding events, actions, and related data must be transmitted over a wide area network or the Internet.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a hybrid Internet-of-Things (IoT) evaluation framework. In IoT networks, various disadvantages exist when evaluating data, triggering alerts, and performing alert analysis at a server. For instance, sensor devices must communicate data periodically to an edge device which, in turn, must send the data to a server where data is evaluated, and alerts are analyzed. As some networks include tens of thousands to millions of sensor devices, high and unpredictable latency often occurs when evaluating data at the server. Additionally, the demand for network bandwidth is substantially increased due to data and corresponding events, actions, and related data being repeatedly transmitted over a network. Performing data and alert evaluation on an edge device can vastly reduce network latency. However, computing resources of edge devices can be very limited, and server side evaluation and analysis can still be utilized.

IoT technologies attempt to place all "things", or devices, on a network, thereby permitting users to remotely monitor, manage, and/or control the devices. A traditional three-tier IoT architecture can include sensor devices, edge devices (also referred to as gateway devices), and one or more servers that can operate in a cloud computing environment. An agent application on the edge devices can interact with sensor devices to collect data for transmission to servers for analysis or storage, or send files and commands to the sensor devices. In some examples, servers provide an administrator console having one or more user interfaces for managing devices in their life cycle; analyzing, storing, and displaying sensor data in real time; creating alerts with customized criteria on data received from sensor devices; and carrying out over-the-air (OTA) operations on sensor devices.

With the advent of IoT, users can automate device operations, for example, through creation of alerts and actions. For instance, users can define alerts that are automatically generated based on device metrics, thresholds, and other criteria. In one example, for a device having a temperature sensor, a user can define an alert that is can be triggered and sent when a measured temperature is greater than or equal to 90 degrees. Further, the user can define an action to be performed automatically when criteria associated with an alert is satisfied. An alert service can evaluate data received from sensor devices based on definitions specified by users, and trigger or cancel alerts. When an alert is triggered, users or computing services can be automatically notified using predefined communication methods, such as email, HTTP request, etc.

Traditionally, when alerts indicate a state of a sensor device is non-operational, administrators investigate, fix identified issues, and revert the sensor device to normal operational state. However, advanced data analysis technologies, such as machine and deep learning, can be carried out to diagnose issues with sensor devices, determine solutions, and automate an action to be performed to resolve the issues.

To perform robust computing calculations, significant computing abilities and resources can be required. However, alert and action services can be more effective when quick response time is achieved. The lower the latency, the faster an alert can be triggered to carry out an action to return a sensor device to a normal operational state. In addition, network bandwidth may be a limiting resource substantially inhibiting wide-scale deployment of IoT technology. Disadvantages of evaluating data points and making decisions for actions on a cloud-based server include high and unpredictable latency and network bandwidth demand.

Evaluating data, analyzing alerts, and performing actions on local fog devices can reduce latency and increase response-time predictability in comparison to performing these functions on cloud server devices. Fog devices can have significant computing abilities and resources, for example, on-premise data centers. While sometimes referred to in the singular for convenience, a fog device can include multiple fog devices executing a distributed fog evaluation service. Evaluating data, analyzing alerts, and performing actions on an edge device can further reduce latency and increase response-time predictability. However, this may or may not be possible when storage or computing ability are insufficient on various types of edge devices, or when the data evaluation criteria or analysis are complicated. For instance, edge devices are not ideal for performing alert definitions across multiple edge systems, calculating advanced statistics, or executing artificial intelligence (AI) routines. In these cases, the use of local fog devices can reduce latency and increase response-time predictability. In addition, if data evaluation, alert analysis, and actions are performed using local fog devices and edge devices, filtering and aggregation can be performed to send a reduced amount of data to cloud servers in less frequent batches. This can vastly reduce the number of data streams and Internet bandwidth usage.

The present disclosure describes a hybrid framework for IoT evaluation. Such a service for alerts and actions can serve up an administrator console having one or more interfaces to create, read, update, or delete (CRUD) alert definitions and actions. A data point evaluator (DPE) is described that evaluates data and triggers alerts. A user interface can be accessed to read or acknowledge alerts. In the various examples described herein, various components can be deployed on fog devices; however, a portion of the components may also be deployed on a cloud server or an edge device.

Figure 1:
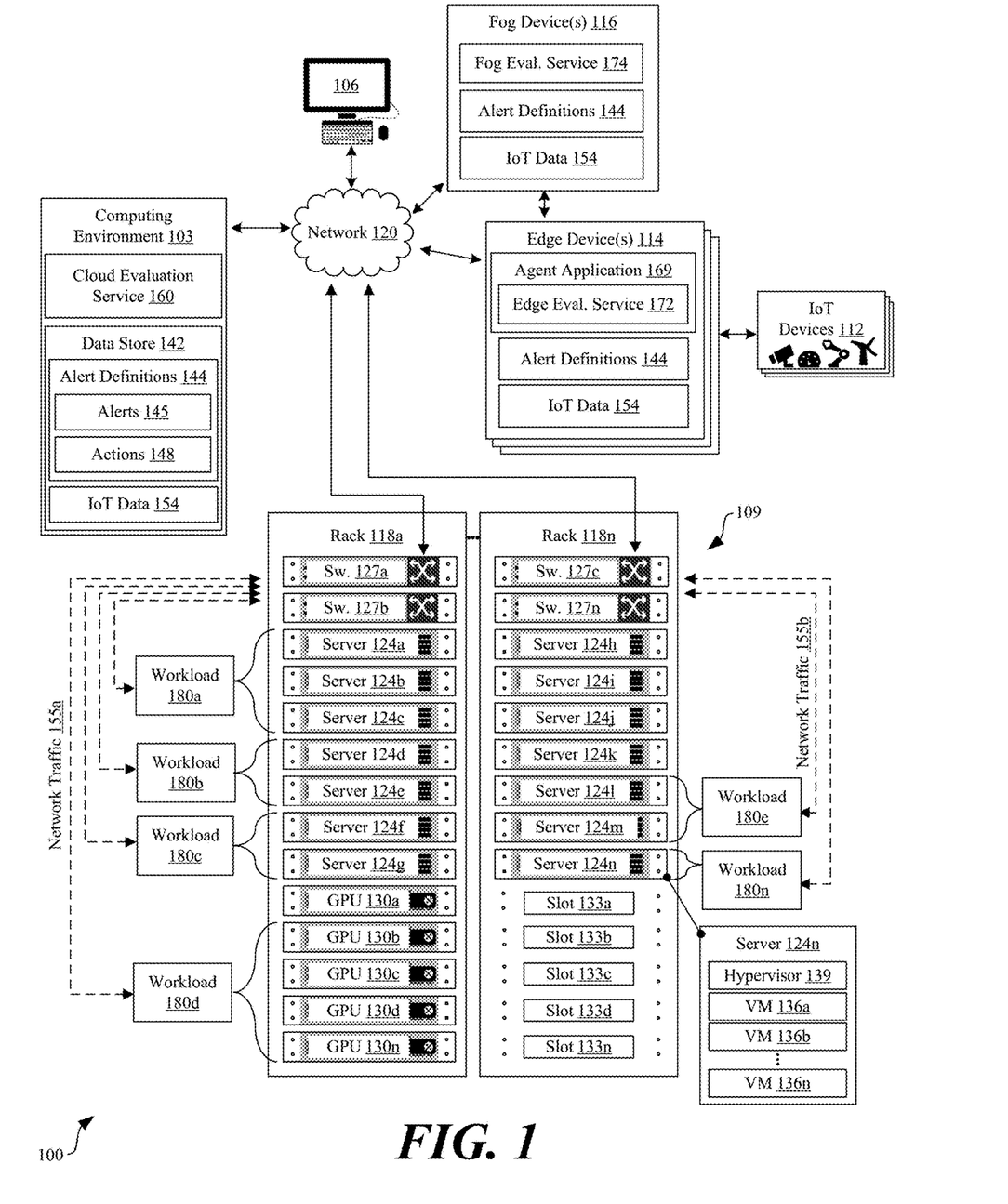
FIG. 1 is a drawing of an example of a networked computing environment for a hybrid IoT evaluation framework.

Turning now to FIG. 1, an example of a networked environment 100 is shown. The networked environment 100 can include a computing environment 103, client devices 106, various computing systems 109, and IoT devices 112 having one or more sensors, edge devices 114, and fog devices 116 in communication with one other over a network 120. The network 120 can include, for example, the Internet, intranets, extranets, wide area networks (WANs), local area networks (LANs), wired networks, wireless networks, other suitable networks, or any combination of two or more such networks.

The network 120 of the networked environment 100 can include satellite networks, cable networks, Ethernet networks, telephony networks, and other types of networks. The computing systems 109 can include devices installed in racks 118a . . . 118n (collectively "racks 118"), which can make up a server bank, aggregate computing system, or a computer bank in a data center or other like facility. In some examples, the computing systems 109 can include high-availability computing systems, which includes a group of computing devices that acts as a single system and provides a continuous uptime. The devices in the computing systems 109 can include any number of physical machines, virtual machines, virtual appliances, and software associated therewith, such as operating systems, drivers, hypervisors, scripts, and applications.

The computing systems 109, and the various hardware and software components contained therein, can include infrastructure of the networked environment 100 that provide one or more computing services. Computing services can include alert services or other application programming interface (API) services. For instance, the computing services can provide an application programming interface that permits an application or service to generate, store, retrieve, delete or otherwise interact with alerts. The alerts may be stored in a data store 142 that can include memory accessible by one or more of a plurality of servers 124a . . . 124n (collectively "servers 124"). For instance, the data store 142 can include one or more relational databases, such as structured query language databases, non-SQL databases, time-series databases, or other relational or non-relational databases.

The computing environment 103 can include an enterprise computing environment that includes hundreds or thousands of physical machines, virtual machines, and other software implemented in devices stored in racks 118, distributed geographically, and connected to one another through the network 120. As such, the computing environment 103 can be referred to as a distributed computing environment in some examples. It is understood that any virtual machine or virtual appliance is implemented using at least one physical device, such as a server or other computing device.

The devices in the racks 118 can include various physical computing resources. The physical computing resources can include, for example, physical computing hardware, such as memory and storage devices, servers 124, switches 127a . . . 127n, graphics cards having one or more GPUs 130a . . . 130n installed thereon, central processing units (CPUs), power supplies, and similar devices. The devices, such as servers 124 and switches 127, can have dimensions suitable for quick installation in slots 133a . . . 133n on the racks 118.

In various examples, the servers 124 can include requisite physical hardware and software to create and manage virtualization infrastructure, a cloud computing environment, an on-premise environment, and/or a serverless computing environment. Also, in some examples, the physical computing resources can be used to provide virtual computing resources, such as virtual machines or other software, such as a computing service.

Each server 124, such as representative server 124n, can act as a host in the networked environment 100, and thereby can include one or more virtual machines (VMs) 136a . . . 136n (collectively "virtual machines 136"). In some examples, a hypervisor 139 can be installed on a server 124 to support a virtual machine execution space within which one or more virtual machines 136 can be concurrently instantiated and executed. The hypervisor 139 can include the ESX™ hypervisor by VMware®, the ESXi™ hypervisor by VMware®, or similar hypervisor 139 in some examples. It is understood that the computing systems 109 can be scalable, meaning that the computing systems 109 in the networked environment 100 can increase or decrease dynamically to include or remove servers 124, switches 127, GPUs 130, power sources, and other components without downtime or otherwise impairing performance of the computing services offered up by the computing systems 109.

Referring now to the computing environment 103, the computing environment 103 can include, for example, a server 124 or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 109, it is understood that in some examples the computing environment 103 can be included as all of, or a part of, the computing systems 109.

For purposes of convenience, the computing environment 103 is sometimes referred to herein in the singular. Even though the computing environment 103 is referred to in the singular, it is understood that a plurality of computing environments 103 can be employed in the various arrangements as described above. As the computing environment 103 communicates with the computing systems 109 and client devices 106 over the network 120, sometimes remotely, the computing environment 103 can be described as a remote computing environment 103 in some examples.

Additionally, in various examples, the computing environment 103 can be implemented in servers 124 of a rack 118 and can manage operations of a virtualized or cloud computing environment through interaction with the computing services.

The computing environment 103 can include a data store 142, which can include one or more databases in some examples. The data store 142 can include memory of the computing environment 103, mass storage resources of the computing environment 103, or any other storage resources on which data can be stored by the computing environment 103. The data store 142 can include memory of the servers 124 in some examples. The data store 142 can include one or more relational databases, such as structured query language databases, non-SQL databases, or other relational or non-relational databases. The data stored in the data store 142, for example, can be associated with the operation of the various services or functional entities described below.

The data store 142 can include alert definitions 144, which can include or specify actions 148 and rules based on IoT data 154 such as states and sensor readings from IoT devices 112. It also contains alerts 145, which are created when a specific device(s) IoT data satisfies the rule defined in the alert definition. IoT data 154 can also include logical grouping information for each of the IoT devices 112, such as its assigned edge group and federation, as discussed in further detail with respect to FIG. 2.

The alert definitions 144 can refer to predefined tasks or actions 148 that are performed in response to alert definition rules being satisfied. For instance, if an IoT device 112 includes a camera, a user can create an alert definition 144 having a corresponding action 148 that notifies security personnel when the camera becomes non-operational or when motion has been detected. An edge group can refer to a logical grouping of an edge device 114, as well as the IoT devices 112 that communicate or connect to the network 120 through that edge device 114. A federation can include a logical grouping of a set of edge devices 114, the IoT devices 112 that communicate through those edge devices 114, and a set of one or more fog devices 116 that executes a fog evaluation service 174 that manages and coordinates those edge devices 114 locally and privately. The logical grouping can also include the single fog evaluation service 174 executed on the one or more fog devices 116, and a number of edge evaluation services 172 executed on the edge devices 114. A federation can include devices that communicate with each other locally over a LAN, private LAN, or private WAN, and without having to transmit data over the Internet or a public WAN.

The components executed on the computing environment 103 can include, for example, a cloud evaluation service 160, as well as other applications, services, processes, systems, engines, or functionality not discussed in detail herein. The cloud evaluation service 160 can provide an administrator console having one or more interfaces to create, read, update, or delete alert definitions 144, alerts 145, and associated actions 148. In some examples, the cloud evaluation service 160 includes a data point evaluator that evaluates sensor data and triggers alerts 145 if alert definitions 144 are satisfied based on the IoT data 154. Further, the cloud evaluation service 160 can serve up one or more user interfaces that can be accessed by the client device 106 to read or acknowledge alerts 145. In the various examples described herein, various components can be deployed on a server; however, a portion of the components may also be deployed on an edge device 114, such as the alert analysis and action decision making (ADM) service and the data point evaluator.

The various physical and virtual components of the computing systems 109 can process workloads 180a . . . 180n. Workloads 180 can refer to the amount of processing that a server 124, switch 127, GPU 130, or other physical or virtual component has been instructed to process or route at a given time. The workloads 180 can be associated with virtual machines 136, public cloud services, private cloud services, hybrid cloud services, virtualization services, device management services, containers, or other software executing on the servers 124.

The IoT devices 112 can include "things" in the IoT networks, such as objects or devices having one or more sensors thereon, such as a camera, temperature sensor, humidity sensor, microphone or audio sensor, presence sensor, or other sensor. To this end, the IoT devices 112 can include touch sensors; physical input devices such as keypads, buttons, and switches; cameras; physical actuators, such as locks; automotive sensors, such as fuel sensors, temperature sensors, engine sensors, and tire sensors; manufacturing sensors, such as assembly line sensors; and industrial sensors, such as windmill and solar panel sensors.

In some examples, IoT devices 112 do not include a wide area network interface, but can include hardware to communicate IoT data 154 measured by the one or more sensors to an edge device 114 located at or near the IoT devices 112. States such as actuator positions, online statuses, device settings, software errors, software versions, and other IoT data 154 can also be communicated to edge devices 114. IoT devices 112 can communicate data to edge devices 114 through connections that utilize Bluetooth®, Zigbee®, or other suitable protocols. The edge devices 114, in turn, can route the IoT data 154 to the fog evaluation service 174 hosted by fog devices 116, as well as to the computing environment 103 provided, for example, by cloud- or Internet-based servers 124. As such, the edge devices 114 can be referred to as gateways as they include a networking module that permits remote communication over the Internet or other suitable networks 120. In some cases, the fog devices 116 can relay or communicate IoT data 154, and alert definitions.

In some examples, an edge device 114 can include an agent application 169 that oversees operation of the edge device 114 as well as IoT devices 112 to which the edge device 114 is paired or assigned. For instance, assuming that an IoT device 112 includes a smart lock that secures a door to a home or business using a keypad that requires entry of a predefined sequence of numbers to open. The IoT device 112 may not have the capability of communicating IoT data 154 over the network 120, for instance, to a server 124. As such, the IoT device 112 can collect successful or unsuccessful attempts to open the smart lock and send the data associated therewith to an edge device 114. The edge evaluation service 172 of the edge device 114 can evaluate the successful or unsuccessful attempts in view of the alert definitions 144 and the IoT data 154, or can forward the IoT data 154 to the fog evaluation service 174 or the cloud evaluation service 160. The edge device 114 that lacks the edge evaluation service 172 can act as a proxy that routes the data to the fog evaluation service 174 over a LAN, or to a computing environment 103 over the Internet. The alert definitions 144 can indicate that an alert 145 is triggered by a number of unsuccessful attempts. The alert definitions 144 can also indicate whether an action 148 is attached to the triggered alert 145. The action 148 can include disabling the smart lock or notifying an owner of the smart lock through a client device 106.

As indicated above the fog devices 116 can host a fog evaluation service 174, similar to the cloud evaluation service 160. However, the fog evaluation service 174 on the fog devices 116 can evaluate IoT data 154 relayed locally from the edge devices 114, without having to communicate data over the Internet or a WAN, thereby reducing network bandwidth usage and latency. In order to further decrease network bandwidth usage and alerting latency, the alert definitions 144 can be resolved in view of the IoT data 154 at the edge evaluation service 172. However, some edge devices 114 can lack the computing power to reliably execute the edge evaluation service 172.

The edge devices 114 can be unable to resolve alert definitions 144 that involve multiple edge devices 114. The fog device 116 can be locally connected, for example over a LAN, to multiple edge devices 114, each of which providing a connection for multiple IoT devices 112. An alert definition 144 can define an alert 145 that is triggered in response to IoT data 154 collected from multiple IoT devices 112 across multiple edge devices 114. In this scenario, each of the edge devices 114 can forward IoT data 154 from its connected IoT devices 112 to the fog evaluation service 174 on fog devices 116. The fog evaluation service 174 can evaluate the IoT data 154 based on the alert definition 144 to identify alerts 145 that are triggered, as well as ameliorating actions 148.

Figure 2:
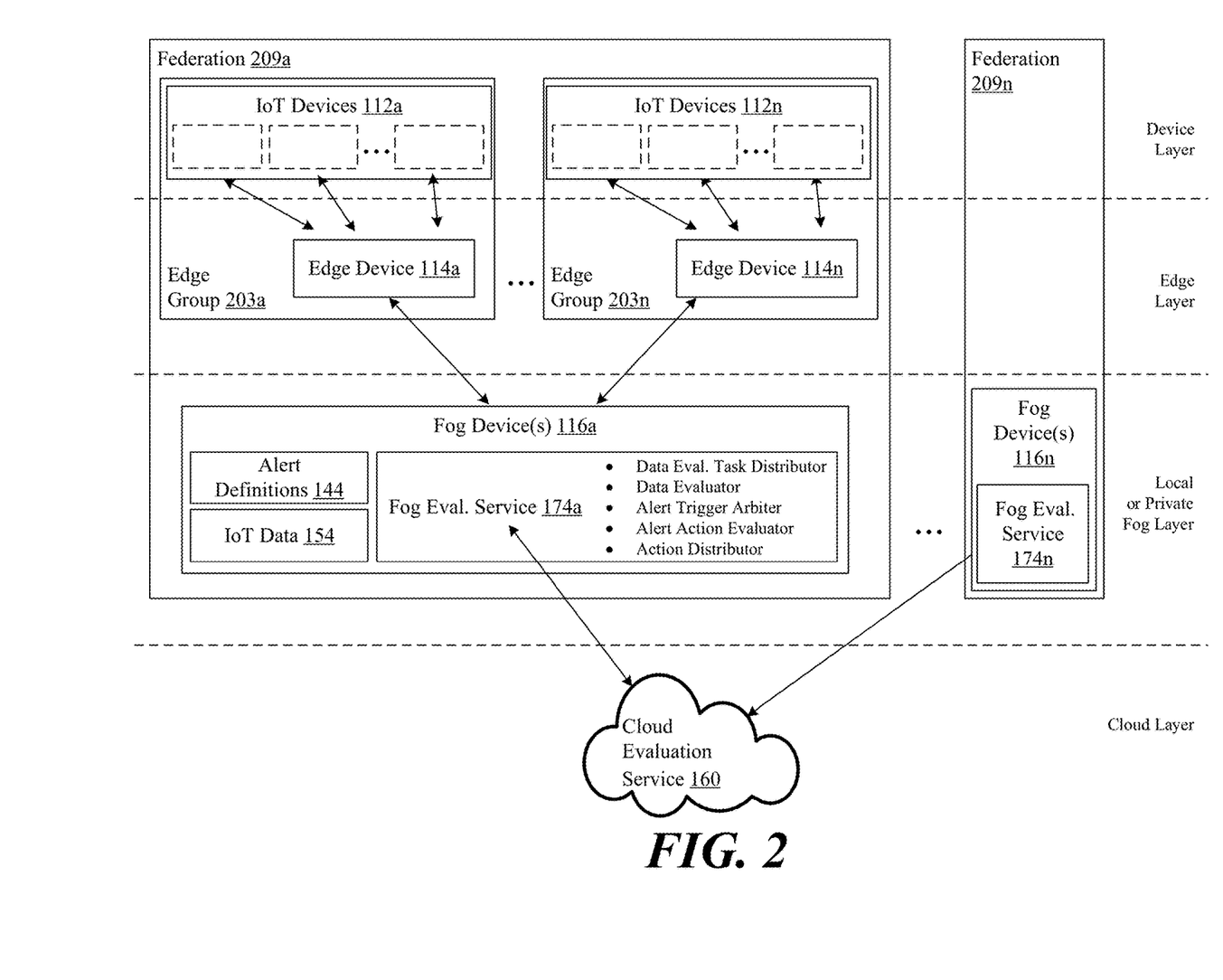
FIG. 2 is a schematic diagram illustrating a four-tier hybrid IoT evaluation framework.

Referring now to FIG. 2, a schematic diagram of a four-tier hybrid IoT evaluation framework is shown. The tiers can include a device layer, an edge layer, a local or private fog layer, and a cloud layer. The device layer can include IoT devices 112 such as IoT devices 112a through 112n.

The edge layer can include any number of edge devices 114 including the edge device 114a and the edge device 114n. The edge group 203a can include the edge device 114a and all of the IoT devices 112a that communicate through the edge device 114a. The edge group 203n can include the edge device 114n and all of the IoT devices 112n that communicate through the edge device 114n.

The local or private fog layer can include a number of fog devices 116a to 116n. The fog layer can include fog evaluation services 174 that are each locally hosted using one or more fog devices 116 of a corresponding federation 209. A fog evaluation service 174 can communicate with other components of the federation 209 locally rather than over the Internet. The fog evaluation service 174a can correspond to a federation 209a and the fog evaluation service 174n can correspond to a federation 209n. The federation 209a can also include the edge groups 203a through 203n, including the edge devices 114a through 114n and their corresponding IoT devices 112a through 112n. The federation 209n can also include a number of edge groups for edge devices, and their corresponding IoT devices 112. The components of each federation 209, including the IoT devices 112, edge devices 114, and fog devices 116, can communicate over a LAN, or in some cases a private WAN without transmitting data over the Internet or a public WAN. The fog devices 116 can include local fog layer devices and/or private fog layer devices.

The cloud layer can include the cloud evaluation service 160, as well as other cloud services. The cloud layer can include a private cloud, or a public cloud hosted on the Internet. The fog devices 116 and the edge devices 114 can communicate with the cloud evaluation service 160 using the Internet or a public WAN. The fog evaluation service 174a can register itself with the cloud evaluation service 160, identifying all associated fog devices 116a, edge devices 114a and IoT devices 112a, of its federation 209a. In other words, a respective fog device 116a, executing a portion of a distributed fog evaluation service 174a, can register itself with the cloud evaluation service 160. The fog evaluation service 174a can also store the profile of all those associated edge devices 114a and IoT devices 112a locally in a data store 142 of the fog device(s) 116a that execute the fog evaluation service 174a.

In turn, each edge evaluation service 172 of a corresponding edge device 114a can register itself, including the edge device 114a and all associated IoT devices 112a of their edge group 203, with the fog evaluation service 174a. Some edge devices 114 have no suitable fog evaluation service 174 to connect to. In this scenario, they can connect to the cloud evaluation service 160 directly. In other words, those edge evaluation services 172 can register themselves and associated IoT devices 112 of their edge group 203 with the cloud evaluation service 160.

In addition, when edge devices 114 are registered and enrolled into the four-tier IoT system, either directly to the cloud evaluation service 160 or through a fog device 116, the cloud evaluation service 160 can maintain a record of all those resource profiles, for example, as IoT data 154 or edge data for edge devices 114. This can include an indication of whether an edge device 114 includes the edge evaluation service 172, agent application 168, and other components. Users can define alert definitions 144 by accessing the cloud evaluation service 160 or other cloud side services of the computing environment 103, for example, through a user interface rendered on a client device 106. The cloud evaluation service 160 can look up the IoT devices 112 associated with the alert definition 144 using the IoT data 154. The cloud evaluation service 160 can identify, for each IoT device 112, its assigned edge group 203 and corresponding edge evaluation service 172, as well as its assigned federation 209 and fog evaluation service 174. The cloud evaluation service 160 can also identify the edge device 114 corresponding the edge evaluation service 172, as well as the fog devices 116 corresponding to the fog evaluation service 174. The cloud evaluation service 160 can determine where the alert definition 144 should be registered or relayed based on this information.

Alert definitions 144 that span across multiple edge devices 114 in its federation 209 can be referred to as multi-edge alert definitions 144. The cloud evaluation service 160 can relay such multi-edge alert definitions 144 to a fog evaluation service 174. Once a fog evaluation service 174 receives a multi-edge alert definition 144 it can analyze, decompose, and transform the multi-edge alert definition 144 into individual sub-definitions according to edge device 114. In other words, individual edge alert sub-definitions can be generated from multi-edge alert definitions 144.

If the fog evaluation service 174 is unable to decompose a multi-edge alert definition 144, then the multi-edge alert definition 144 can be registered in the fog evaluation service 174. As one example, assume IoT devices 112a, through IoT devices 112n, each collect a metric "M1" such as temperature. A multi-edge alert definition 144 can trigger if a mean or average value for the temperature M1 across all the devices is greater than a threshold T1. The fog evaluation service 174 may be unable to decompose this alert criteria because it involves an operation that uses all of the IoT devices 112a . . . 112n concurrently.

In a second example, assume again that IoT devices 112*a* ... 112*n*, each collect the metric M1. Another multi-edge alert definition 144 can trigger if there are more than T2 individual devices (threshold number or threshold percentage of the known total number) which meet the criteria M1>T1. This multi-edge alert definition 144 can be resolved by the fog evaluation service 174 but, can also be decomposed into sub-definitions that are resolved by the edge evaluation services 172 and returned to the fog evaluation service 174.

For example, an individual edge alert definition can be triggered on the edge device 114*a* when any one of its IoT devices 112*a* meet the criteria M1>T1, and the edge device 114*a* can transmit this to the fog evaluation service 174*a* on fog device 116*a*. Likewise, an individual edge alert definition can be triggered on the edge device 114*n* when any one of its IoT devices 112*n* meet the criteria M1>T1, and the edge device 114*n* can transmit this to the fog evaluation service 174*a* on fog device 116*a*. The fog evaluation service 174*a* can determine that the original multi-edge alert definition 144 is triggered if the number of devices that meet the criteria M1>T1 goes over the threshold number (or percentage) T2. The fog evaluation service 174*a* can identify actions 148 to perform at this point, because the original multi-edge alert definition 144 is triggered.

In some cases, the number of devices that meet the criteria M1>T1 can go over the threshold number (or percentage) T2 for the devices communicating through the edge device 114*a* alone. The edge device 114*a* can determine that the original multi-edge alert definition 144 is triggered based on activity on the single edge device 114. As a result, the fog evaluation service 174*a* can identify this possibility and transmit the original multi-edge alert definition 144 for registration in the edge devices 114*a* to 114*n*, as well as transmit the sub-definitions to the edge devices 114*a* through 114*n*. The fog evaluation service 174*a* can determine whether to include the original multi-edge alert definition 144 for registration in the edge devices 114*a* to 114*n* based on the computational availability of these devices, memory availability, and other factors.

In a third example, assume that IoT devices 112*a* collect a first metric M1 while IoT devices 112*n* collect a second metric M2. Other IoT devices 112 connected to other edge devices 114 in the federation 209*a* can collect additional metrics. Another multi-edge alert definition 144 can trigger if the average value of M1 across IoT devices 112*a* is greater than a threshold value T1, and at the same time, the average value of M2 across IoT devices 112*n* is greater than a threshold value T2 (avg (M1)>T1 && avg (M2)>T2). The fog evaluation service 174*a* can generate and transmit an individual edge alert sub-definition avg (M1)>T1 to the edge device 114*a*, as well as also generate and transmit an individual edge alert sub-definition avg (M2)>T2 to the edge device 114*n*. If the fog evaluation service 174*a* receives an indication that each of these individual edge alert sub-definition have triggered, it can trigger the multi-edge alert definition 144 and perform appropriate actions 148.

Generally, in cases where a multi-edge alert definition 144 can be decomposed to several individual edge alert sub-definitions, a fog evaluation service 174 can create a map for the multi-edge alert definition 144 and all of the decomposed individual edge alert sub-definitions. The fog evaluation service 174 can maintain a status for each multi-edge alert definition 144 and the decomposed individual edge alert sub-definitions. The fog evaluation service 174 registers each individual edge alert sub-definition into the corresponding edge device 114, if that edge device 114 has an edge evaluation service 172. For those edge devices 114 that lack an edge evaluation service 172, their corresponding alert criterion are registered in the fog evaluation service 174 in the fog devices 116. Data points can be ingested to the agent application 169 on its associated edge device 114, which has an edge evaluation service 172. If the registered individual edge alert sub-definition (derived from the multi-edge alert definition 144) is met based on the ingested data points, the agent application 169 can forward the information to fog evaluation service 174.

The fog evaluation service 174 can change the corresponding individual edge alert sub-definition status to true and check whether the overall multi-edge alert definition 144 has been fulfilled. If so, an alert 145 can be triggered, and the evaluation service 174 can analyze the alert and choose appropriate actions 148 to be carried out. Once the action 148 is determined, the fog evaluation service 174 can distribute those commands to agents on corresponding edge devices 114, transmit notifications to the cloud evaluation service 160 or a client device 106 over the Internet, and perform other actions 148. Actions 148 can include a set of commands for different IoT devices 112 across multiple edge devices 114, as well as commands for the edge devices 114 themselves. The fog evaluation service 174 can pass these commands to the corresponding devices to be executed. The fog evaluation service 174 can also transmit a notification or information for the triggered alert 145 and action 148 to the cloud evaluation service 160 for record storage and user interface generation and display purposes. A user can view the user interface through a client device 106.

The four-tier hybrid IoT evaluation framework can minimize response time for each alert definition 144 by distributing the definition as close to the device layer as possible. In addition, this framework has the ability to resolve alert definitions 144 that involve multiple edge devices 114 while minimizing response times by resolving these multi-edge alert definitions 144 based on IoT data 154 at the local or private fog layer, rather than at the cloud or Internet layer. Moreover, the fog evaluation service 174 can decompose alert definitions 144 into multiple sub-definitions and, transmit the sub-definitions to be resolved at the edge layer. Sub-definition alerts received from the edge layer can be combined by the fog evaluation service 174 to resolve the multi-edge alert definition 144 and trigger appropriate alerts 145 and corresponding actions 148.

Figure 3:
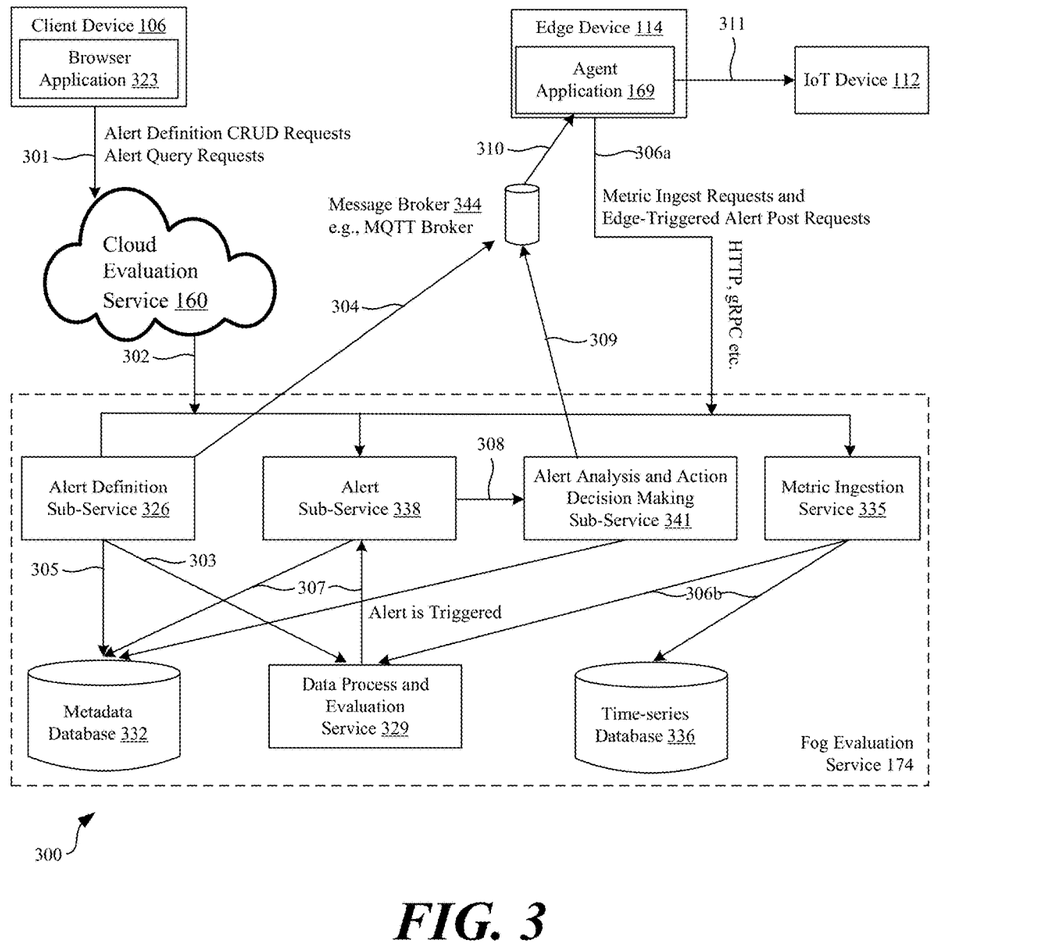
FIG. 3 is a schematic diagram illustrating the operation of fog evaluation service in an example hybrid IoT evaluation framework.

Turning now to FIG. 3, a schematic diagram 300 is shown that illustrates the operation of a fog evaluation service 174 in an example hybrid IoT evaluation framework. As shown in FIG. 3, the workflow includes various steps. At step 301, a user can define an alert definition 144 through a request made through a browser application 323 of a client device 106 or another suitable client application. The cloud evaluation service 160 can analyze the alert definition 144 to determine whether the alert definition 144 should be passed to the fog evaluation service 174 or registered to the cloud evaluation service 160. This process is discussed in further detail with reference to FIG. 4.

In step 302, where the alert definition 144 is passed to the fog evaluation service 174, the request to register an alert definition 144 can be directed to an alert definition sub-service 326, which can carry out data evaluation task distribution. This can include determining whether the alert definition 144 is decomposable into edge alert sub-definitions, and identifying which edge evaluation service 172 the alert sub-definitions should be passed to. This process is discussed in further detail with reference to FIG. 4.

In step 303, if the alert definition 144 is to be registered to fog evaluation service 174, the alert definition sub-service 326 can send a request to a data process and evaluation service 329 for creating tasks for evaluating data received from IoT devices 112. In step 304, if the alert definition 144 is decomposed into multiple edge alert sub-definitions and all or part of them need to be registered to edge evaluation services 172, the alert definition sub-service 326 can send requests to appropriate edge evaluation services 172. For example, those requests can be sent through message broker 344 to edge device 114 agent application 169 for creating tasks for evaluating data received from IoT devices 112.

In step 305, once an alert definition 144 is successfully registered, the alert definition sub-service 326 can optionally save the alert definition 144 in a metadata database 332 or other suitable data store 142 on the fog devices 116. In step 306a, the agent application 169 on edge device 114 can collect and send metric values to its local edge evaluation service 172 or to a metric ingestion service 335 on fog evaluation service 174 through HTTP or gRPC etc. If the local edge evaluation service 172 triggers an alert for an alert sub-definition, the trigger message should be sent to alert sub-service 338 in fog evaluation service 174 through HTTP or gRPC etc. The alert sub-service 338 keeps the record of the alert definition 144 and all its sub-definitions. When it receives an alert message for a sub-definition, it will update the status for its corresponding alert sub-definition and act as an alert trigger arbiter to determine whether the alert for the alert definition 114 should be triggered. In step 306b, the metric ingestion service 335 of fog evaluation service 174 can ingest metrics and other data received from the IoT devices 112, optionally store the data in a time-series database 336, and send the data to the data process and evaluation service 329 for alert definition 144 or some sub-definitions which are registered into it.

Next, in step 307, when an alert definition 144 is met and an alert 145 is triggered, an alert sub-service 338 can optionally store a record of the alert 145 in the metadata database 332 or other suitable data store 142. In step 308, the alert sub-service 338 can send information associated with the alert 145 to an action decision making sub-service 341 to determine actions 148, if any, that should be carried out. The actions 148 can include remedial actions that return an IoT device 112 to a normal operational state, notify a user through a client application or operating system of a client device 106, or other actions 148. For multi-edge alert definitions, actions might span across multiple edge devices 114, that is, fog evaluation service 174 can act as an action command distributor.

In step 309, the action decision making sub-service 341 can send a request for an action 148 back to the agent application 169. In some examples, the request can be sent through one or more communication mechanisms including a message broker 344. The message broker 344 can include an MQ Telemetry Transport (MQTT) broker in some examples. As such, the action decision making sub-service 341 can publish a request to the message broker 344.

In step 310, the agent application 169 of the edge device 114 can receive the request by subscribing to a corresponding channel from the message broker 344. In step 311, the agent application 169 can then pass the action 148, such as a command for the IoT device 112, to a corresponding IoT device 112 to be carried out. A command can include a remedial action, such as rebooting, restoring software to a prior version, toggling a hardware component, installing a version of firmware, or other suitable remedial action.

Delay can be reduced by evaluating IoT data 154 to identify alerts 145 and actions 148 using the edge device 114 or fog evaluation service 174 on fog devices 116. In addition, data corresponding to alert definitions 144 that can be resolved using an edge evaluation service 172 or fog evaluation service 174 does not need to be transmitted or stored on a server 124 of the cloud evaluation service 160. If an alert 145 and an action 148 are performed on the edge evaluation service 172 or fog evaluation service 174, data filtering and aggregation can be carried out locally to send only necessary data back to the cloud evaluation service 160 in batches, vastly reducing usage of network bandwidth.

Figure 4:
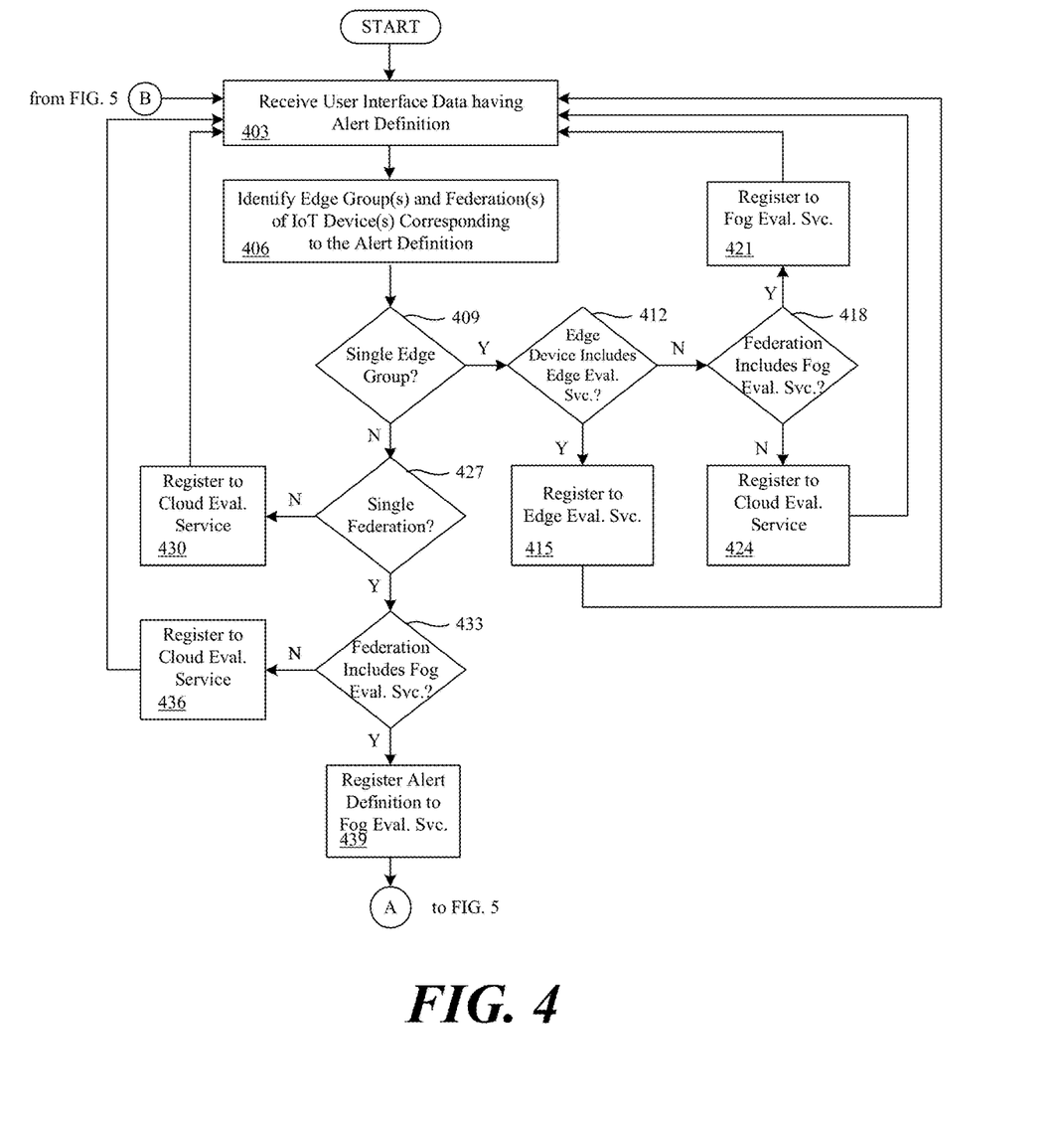
FIG. 4 is a flowchart illustrating functionality implemented by components of the networked computing environment of FIG. 1 for a hybrid IoT evaluation framework.

Moving to FIG. 4, a flowchart is shown that provides one example of the operation of a portion of the networked environment 100. While the flowchart of FIG. 4 can generally be viewed as depicting an example of elements of a method implemented by the cloud evaluation service 160 executing in the computing environment 103, additional functionality is performed by other components of the networked environment 100. The separation or segmentation of functionality as discussed herein is presented for illustrative purposes only.

In step 403, the cloud evaluation service 160 can receive user interface data having alert definitions 144. For instance, the computing environment 103 can provide an administrator console comprising of one or more user interfaces having fields for customizing alert definitions 144 which indicate alerts 145 that can be triggered by states and measurements of the IoT devices 112. The actions 148 to perform in response to the alerts 145 can be entered and defined through the administrator console. In some examples, the actions 148 include remedial actions, such as those that return an IoT device 112 to a normal operational state.

In some examples, the cloud evaluation service 160 can generate an alert 145 and an action 148 to perform, for instance, based on the alert definitions 144 received from, for example, the administrator console or other suitable user interface. An alert definition 144 can include a data structure that comprises one or more identifiers that uniquely identify individual ones of the edge devices 114, the states and metrics it should provide or report, and the condition that triggers an alert 145. The cloud evaluation service 160, edge evaluation service 172, or fog evaluation service 174 can transmit a command for the corresponding IoT device 112 to provide the relevant metrics or states for the alert definition 144.

In step 406, the cloud evaluation service 160 can an identify an edge group 203 and federation 209 for each IoT device 112 specified in the alert definition 144. In other words, an edge group 203 can include a single edge evaluation service 172 of a single edge device 114, and a federation 209 can include a single fog evaluation service 174 executed by one or more fog devices 116. As a result, the cloud evaluation service 160 can identify the edge device 114 and fog devices 116 for individual IoT devices 112 specified in the alert definition 144, as well as the edge evaluation service 172 and the fog evaluation service 174. In some cases, the alert definition 144 can include unique identifiers for each of the edge device 114, edge group 203, fog devices 116, and federation 209 to which an IoT device 112 is assigned. In other cases, the cloud evaluation service 160 can identify this information based on the IoT data 154 stored in the computing environment 103.

In step 409, the cloud evaluation service 160 can determine whether the IoT devices 112 corresponding to the alert definition 144 are assigned to a single edge group 203. In other words, whether the IoT devices 112 specified in the alert definition 144 communicate through a single edge device 114. If all of the IoT devices 112 are assigned to a single edge group 203, the process can move to step 412. Otherwise, if any two of the IoT devices 112 are assigned to different edge groups 203, the process can move to step 427.

In step 412, the cloud evaluation service 160 can determine whether the edge device 114 of the single edge group 203 includes an edge evaluation service 172. If the edge device 114 includes the edge evaluation service 172 the process can move to step 415. If the edge device 114 lacks the edge evaluation service 172 the process can move to step 418.

In step 415, the cloud evaluation service 160 can register the alert definition 144 to the edge evaluation service 172 of the edge device 114. The alert definition 144 can be registered to the edge evaluation service 172 directly or indirectly through a fog evaluation service 174. For example, the cloud evaluation service 160 can transmit a command to register the alert definition 144 to edge evaluation service 172. The command can be transmitted directly to the edge evaluation service 172 or relayed through the fog evaluation service 174. In this scenario, whether or not the IoT devices 112 corresponding to the alert definition 144 are assigned to a federation 209 that includes a fog evaluation service 174, the alert definition 144 can be most efficiently resolved at the edge layer by the edge evaluation service 172. As a result, in some cases, the cloud evaluation service 160 can register the alert definition 144 to the edge evaluation service 172 without determining whether the IoT devices 112 are assigned to a federation 209 that includes a fog evaluation service 174. However, in some cases the cloud evaluation service 160 can make such a determination, and if the IoT devices 112 are assigned to a federation 209 that includes a fog evaluation service 174, the cloud evaluation service 160 can transmit the alert definition 144 to the fog evaluation service 174, which can forward the alert definition down to the edge evaluation service 172.

Once registered, the edge evaluation service 172 can analyze the alert definition 144 to identify states and metrics that the respective IoT devices 112 should report. The edge evaluation service 172 can transmit commands to the respective IoT devices 112 to provide the relevant states and metrics and other IoT data 154 required to resolve the alert definition 144. For example, the edge evaluation service 172 can transmit commands that indicate for the IoT device 112 to transmit relevant states, metrics, and other IoT data 154 to a network endpoint or address of the edge device 114. The edge evaluation service 172 can maintain statuses for the IoT data 154. The edge evaluation service 172 can monitor and evaluate the IoT data 154 provided from the IoT devices 112 to identify a condition that triggers an alert 145 as specified in the alert definition 144. The edge evaluation service 172 can identify and implement appropriate actions 148 specified in the alert definition 144. The edge evaluation service 172 can transmit commands to the IoT devices 112 to perform the corresponding actions 148 and, report the alert 145 to the fog evaluation service 174 and the cloud evaluation service 160.

In step 418, if the edge device 114 lacks the edge evaluation service 172, the cloud evaluation service 160 can determine whether the IoT devices 112 are assigned to a federation 209 that includes a fog evaluation service 174. If the IoT devices 112 are assigned to a federation 209 that includes a fog evaluation service 174, then the process can move to step 421. If the IoT devices 112 are not assigned to a federation 209 or are assigned to a federation that lacks a fog evaluation service 174, then the process can move to step 424.

In step 421, the cloud evaluation service 160 can register the alert definition 144 to the fog evaluation service 174 of the fog devices 116. For example, the cloud evaluation service 160 can transmit a command to register the alert definition 144 to the fog evaluation service 174. Once registered, the fog evaluation service 174 can analyze the alert definition 144 to identify states and metrics that the respective IoT devices 112 should report. The fog evaluation service 174 can transmit commands to the respective IoT devices 112 to provide the relevant states, metrics, and other IoT data 154 required to resolve the alert definition 144. For example, the fog evaluation service 174 can transmit commands that indicate for the IoT device 112 to transmit relevant states, metrics, and other IoT data 154 to a network endpoint or address of the fog evaluation service 174. In some cases, the fog evaluation service 174 can relay commands to the respective IoT devices 112 through the edge devices 114. The fog evaluation service 174 can maintain statuses for the IoT data 154. The fog evaluation service 174 can monitor and evaluate the IoT data 154 provided from the IoT devices 112 to identify a condition that triggers an alert 145 as specified in the alert definition 144. The fog evaluation service 174 can identify and implement appropriate actions 148 specified in the alert definition 144. The fog evaluation service 174 can transmit commands to the IoT devices 112 to perform the corresponding actions 148. The fog evaluation service 174 can also report the alert 145 to the cloud evaluation service 160.

In step 424, the cloud evaluation service 160 can register the alert definition 144 to the cloud evaluation service 160 itself. Once registered, the cloud evaluation service 160 can analyze the alert definition 144 to identify states and metrics that the respective IoT devices 112 should report. The cloud evaluation service 160 can transmit commands to the respective IoT devices 112 to provide the relevant states, metrics, and other IoT data 154 required to resolve the alert definition 144. For example, the cloud evaluation service 160 can transmit commands that indicate for the IoT device 112 to transmit relevant states, metrics, and other IoT data 154 to a network endpoint or address of the computing environment 103. In some cases, the cloud evaluation service 160 can relay commands to the respective IoT devices 112 through fog devices 116 and/or edge devices 114. The cloud evaluation service 160 can maintain statuses for the relevant IoT data 154. The cloud evaluation service 160 can monitor and evaluate the IoT data 154 provided from the IoT devices 112 to identify a condition that triggers an alert 145 as specified in the alert definition 144. The cloud evaluation service 160 can identify and implement appropriate actions 148 specified in the alert definition 144. The cloud evaluation service 160 can transmit commands to the IoT devices 112 to perform the corresponding actions 148.

In step 427, if the IoT devices 112 belong to multiple edge groups 203, the cloud evaluation service 160 can determine whether the edge groups 203 are all part of a single federation 209. If the edge devices 114 for the IoT devices 112 specified in the alert definition 144 are assigned to multiple federations 209, then the process can move to step 430. If the edge devices 114 for the IoT devices 112 specified in the alert definition 144 are assigned to a single federation 209, then the process can move to step 433.

In step 430, the cloud evaluation service 160 can register the alert definition 144 to the cloud evaluation service 160 itself. In this scenario, the cloud evaluation service 160 is suited to resolve the alert definition 144 because multiple edge groups 203 are involved, but they are distributed across multiple federations 209 that are logically or physically isolated from one another. For example, in this scenario, no single fog evaluation service 174 has the ability, or is permitted to, communicate with all of the edge groups 203 or edge devices 114 required for the alert definition. Once registered, the cloud evaluation service 160 can analyze the alert definition 144 to identify states and metrics that the respective IoT devices 112 should report. The cloud evaluation service 160 can transmit commands to the respective IoT devices 112 to provide the relevant states, metrics, and other IoT data 154 required to resolve the alert definition 144. The cloud evaluation service 160 can maintain statuses for the relevant IoT data 154. The cloud evaluation service 160 can monitor and evaluate the IoT data 154 provided from the IoT devices 112 to identify a condition that triggers an alert 145 as specified in the alert definition 144. The cloud evaluation service 160 can identify and implement appropriate actions 148 specified in the alert definition 144. The cloud evaluation service 160 can transmit commands to the IoT devices 112 to perform the corresponding actions 148.

In step 433, the cloud evaluation service 160 can determine whether the IoT devices 112 are assigned to a federation 209 that includes a fog evaluation service 174. If the IoT devices 112 are not assigned to a federation 209 or are assigned to a federation 209 that lacks a fog evaluation service 174, then the process can move to step 436. If the IoT devices 112 are assigned to a federation 209 that includes a fog evaluation service 174, then the process can move to step 439.

In step 436, the cloud evaluation service 160 can register the alert definition 144 to the cloud evaluation service 160 itself. In this scenario, the cloud evaluation service 160 is suited to resolve the alert definition 144 because while a single federation 209 of multiple edge devices 114 are utilized for the alert definition 144, there is no fog device 116 and no fog evaluation service 174 to resolve the alert definition 144 at the fog layer. Once registered, the cloud evaluation service 160 can analyze the alert definition 144 to identify states and metrics that the respective IoT devices 112 should report. The cloud evaluation service 160 can transmit commands to the respective IoT devices 112 to provide the relevant states, metrics, and other IoT data 154 required to resolve the alert definition 144. The cloud evaluation service 160 can maintain statuses for the relevant IoT data 154. The cloud evaluation service 160 can monitor and evaluate the IoT data 154 provided from the IoT devices 112 to identify a condition that triggers an alert 145 as specified in the alert definition 144. The cloud evaluation service 160 can identify and implement appropriate actions 148 specified in the alert definition 144. The cloud evaluation service 160 can transmit commands to the IoT devices 112 to perform the corresponding actions 148.

In step 439, the cloud evaluation service 160 can register the alert definition 144 to the fog evaluation service 174. For example, the cloud evaluation service 160 can transmit the alert definition 144 to the agent application 169, which can provide the alert definition 144 to the fog evaluation service 174. In this scenario, multiple edge devices 114 are involved in the alert definition 144, so the alert definition can be considered a multi-edge alert definition 144. In addition, all of the relevant edge devices 114 are assigned to a single federation 209 that includes a fog evaluation service 174 capable of resolving the multi-edge alert definition 144. The fog evaluation service 174 can also perform additional functionality as described with reference to FIG. 5.

Figure 5:
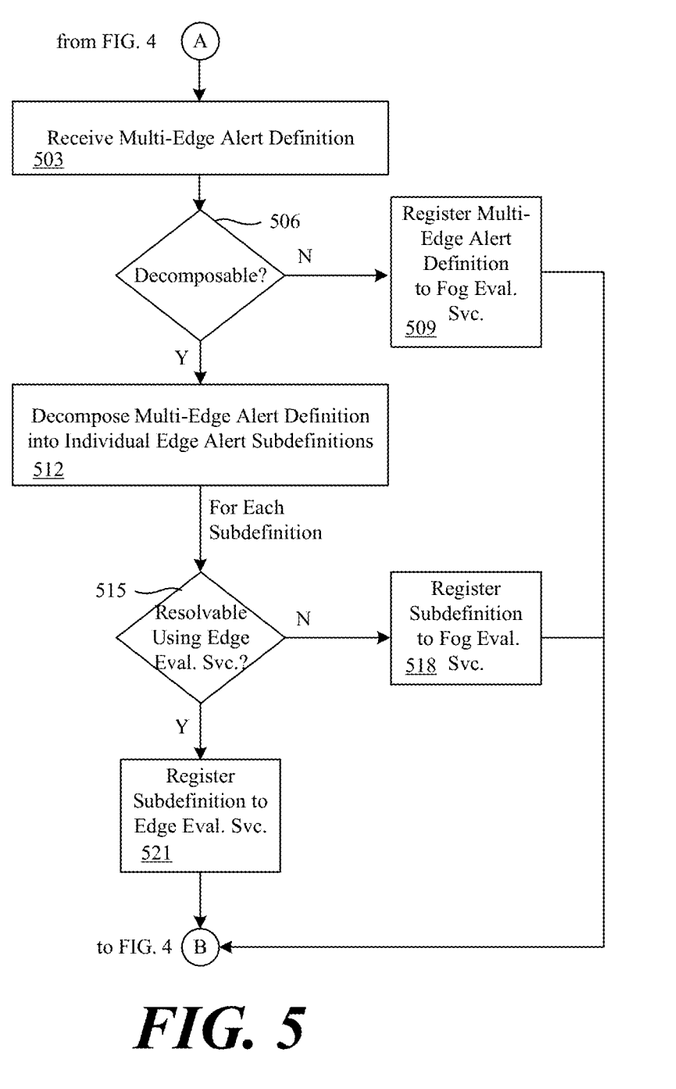
FIG. 5 is another flowchart illustrating functionality implemented by components of the networked computing environment of FIG. 1 for a hybrid IoT evaluation framework.

Moving to FIG. 5, a flowchart is shown that provides one example of the operation of a portion of the networked environment 100. While the flowchart of FIG. 5 can generally be viewed as depicting an example of elements of a method implemented by a fog evaluation service 174 executing in one or many fog devices 116, additional functionality is performed by other components of the networked environment 100. The separation or segmentation of functionality as discussed herein is presented for illustrative purposes only.

In step 503, the fog evaluation service 174 can receive a multi-edge alert definition 144 from the cloud evaluation service 160. As also discussed with reference to FIG. 4, in this scenario, multiple edge devices 114 are involved in the alert definition 144, and all of the relevant edge devices 114 are assigned to a single federation 209 that includes a fog evaluation service 174 capable of resolving the multi-edge alert definition 144.

In step 506, the fog evaluation service 174 can determine whether the multi-edge alert definition 144 is decomposable. If the fog evaluation service 174 is unable to decompose the multi-edge alert definition 144, then the process can move to step 509. If the multi-edge alert definition 144 is decomposable then the process can move to step 512.

In step 509, if the fog evaluation service 174 is unable to decompose a multi-edge alert definition 144, then the multi-edge alert definition 144 can be registered in the fog evaluation service 174. Since the fog evaluation service 174 is unable to decompose a multi-edge alert definition 144 into individual edge alert sub-definitions, there is no definition can be registered and resolved at an edge layer closer to the IoT devices 112.

Once registered, the fog evaluation service 174 can analyze the multi-edge alert definition 144 to identify states and metrics that the respective IoT devices 112 should report through their assigned edge devices 114. The fog evaluation service 174 can transmit commands to the respective IoT devices 112 to provide the relevant states, metrics, and other IoT data 154 required to resolve the alert definition 144. For example, the fog evaluation service 174 can transmit commands that indicate for the IoT device 112 to transmit relevant states, metrics, and other IoT data 154 to a network endpoint or address of the fog evaluation service 174. The fog evaluation service 174 can maintain statuses for the IoT data 154. The fog evaluation service 174 can monitor and evaluate the IoT data 154 provided from the IoT devices 112 to identify a condition that triggers an alert 145 as specified in the alert definition 144. The fog evaluation service 174 can identify and implement appropriate actions 148 specified in the alert definition 144. The fog evaluation service 174 can transmit commands to the IoT devices 112 to perform the corresponding actions 148. The fog evaluation service 174 can also report the alert 145 to the cloud evaluation service 160.

In step 512, the fog evaluation service 174 can decompose the multi-edge alert definition into individual edge alert sub-definitions. Each of the individual edge alert sub-definitions can be resolved by a single or individual edge device 114. The fog evaluation service 174 can generate a map for the multi-edge alert definition 144 and all the decomposed individual edge alert sub-definitions. The fog evaluation service 174 can maintain a status for each of the multi-edge alert definitions 144 and the decomposed individual edge alert sub-definitions.

In step 515, the fog evaluation service 174 can determine, for each of the individual edge alert sub-definitions derived from the multi-edge alert definition 144, whether the individual edge alert sub-definition is resolvable using an edge device 114. For example, the fog evaluation service 174 can determine whether the edge device 114 has sufficient hardware and software resources to resolve the individual edge alert sub-definition. For example, if the edge device 114 lacks the edge evaluation service 172, sufficient available memory, sufficient available compute, or sufficient availability network throughput, then the process can move to step 518. However, if the edge device 114 includes the edge evaluation service 172, sufficient available memory, sufficient available compute, and sufficient availability network throughput, then the process can move to step 521.

In step 518, the fog evaluation service 174 can register the individual edge alert sub-definition to the fog device 116. In this scenario the fog device 116 is suited to perform the individual edge alert sub-definition rather than the edge device 114, because the edge device 114 lacks the necessary hardware or software resources to resolve the individual edge alert sub-definition closer to the device layer. As a result, the individual edge alert sub-definition can be registered with the fog evaluation service 174, along with a mapping of all individual edge alert sub-definitions that together constitute the multi-edge alert definition 144. This nevertheless is more efficient because other individual edge alert sub-definitions of the multi-edge alert definition 144 can be resolved at the edge layer, as discussed with respect to step 521.

Once registered, the fog evaluation service 174 can analyze the individual edge alert definition to identify states and metrics that the respective IoT devices 112 should report through their assigned edge devices 114. The fog evaluation service 174 can transmit commands to the respective IoT devices 112 to provide the relevant states, metrics, and other IoT data 154 required to resolve the individual alert sub-definition. For example, the fog evaluation service 174 can transmit commands that indicate for the IoT device 112 to transmit relevant states, metrics, and other IoT data 154 to a network endpoint or address of the fog evaluation service 174.

The fog evaluation service 174 can monitor and evaluate the IoT data 154 provided from the IoT devices 112 to identify a condition that triggers an alert 145 as specified in the individual alert sub-definition. The fog evaluation service 174 can change the corresponding individual edge alert sub-definition status to true and check whether the overall multi-edge alert definition 144 has been fulfilled. For example, the fog evaluation service 174 can monitor and evaluate alerts received from edge devices 114 that are evaluating other ones of the individual alert sub-definitions of the multi-edge alert definition 144. If all of the individual edge alert sub-definitions statuses are true, the trigger condition of the multi-edge alert definition 144 is met. The fog evaluation service 174 can identify and implement appropriate actions 148 specified in the alert definition 144. The fog evaluation service 174 can transmit commands to the IoT devices 112 to perform the corresponding actions 148. The fog evaluation service 174 can also report the alert 145 to the cloud evaluation service 160.

In step 521, the fog evaluation service 174 can register the individual edge alert sub-definition to the corresponding edge device 114. For example, the fog evaluation service 174 can transmit the individual edge alert sub-definition to the corresponding edge device 114 along with a command to register the individual edge alert sub-definition. Once registered, the edge evaluation service 172 can analyze the individual alert sub-definition to identify states, metrics, and other IoT data 154 that the respective IoT devices 112 should report. The edge evaluation service 172 can transmit commands to the respective IoT devices 112 to provide the relevant states, metrics, and other IoT data 154 required to resolve the individual alert sub-definition. For example, the edge evaluation service 172 can transmit commands that indicate for the IoT device 112 to transmit relevant states, metrics, and other IoT data 154 to a network endpoint or address of the edge device 114. The edge evaluation service 172 can maintain statuses for the IoT data 154. The edge evaluation service 172 can monitor and evaluate the IoT data 154 provided from the IoT devices 112 to identify a condition that triggers an alert 145 as specified in the individual alert sub-definition. If an alert 145 is triggered, the edge evaluation service 172 can transmit the alert 145 to the fog evaluation service 174.

The fog evaluation service 174 can monitor and evaluate alerts received from edge devices 114. If all corresponding individual edge alert sub-definitions statuses are true, the trigger condition of the multi-edge alert definition 144 is met. The fog evaluation service 174 can identify and implement appropriate actions 148 specified in the alert definition 144. The fog evaluation service 174 can transmit commands to the IoT devices 112 to perform the corresponding actions 148. The fog evaluation service 174 can also report the alert 145 to the cloud evaluation service 160.

Stored in the device memory are both data and several components that are executable by the processor. Also stored in the memory can be a data store and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the computing environment 103. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device; and
   program instructions stored in at least one memory of the at least one computing device, wherein the instructions, when executed by at least one processor, cause the at least one computing device to at least:
   receive, by a fog evaluation service executed by at least one fog device of a local or private fog layer of a hybrid Internet-of-Things (IoT) evaluation framework, a multi-edge alert definition that specifies a plurality of IoT devices that communicate through a plurality of edge devices;
   register the multi-edge alert definition in the fog evaluation service for evaluation;
   receive, by the fog evaluation service from the plurality of edge devices, data corresponding to the plurality of IoT devices;
   trigger, by the fog evaluation service, an alert based on a condition specified in the multi-edge alert definition being met based on the data corresponding to the plurality of IoT devices; and
   transmit, from the fog evaluation service to a cloud evaluation service of a cloud layer of the hybrid IoT evaluation framework, an indication that the alert is triggered.

2. The system of claim 1, wherein the instructions, when executed by the at least one processor, cause the at least one computing device to at least:
   receive, from individual ones of the plurality of edge devices, IoT data relayed from individual ones of the plurality of IoT devices, wherein the data comprises the IoT data, and the alert is triggered based on the IoT data.

3. The system of claim 1, wherein the instructions, when executed by the at least one processor, cause the at least one computing device to at least:
   decompose the multi-edge alert definition into a plurality of individual edge alert sub-definitions resolvable by individual ones of the plurality of edge devices; and
   transmit the plurality of individual edge alert definitions from the fog evaluation service to the individual ones of the plurality of edge devices.

4. The system of claim 3, wherein the instructions, when executed by the at least one processor, cause the at least one computing device to at least:
   create a mapping of the individual edge alert sub-definitions for the multi-edge alert definition; and
   maintain a status for the individual edge alert sub-definitions for the multi-edge alert definition.

5. The system of claim 3, wherein the instructions, when executed by the at least one processor, cause the at least one computing device to at least:
receive, from the individual ones of the plurality of edge devices, edge alerts corresponding to the plurality of individual edge alert definitions, wherein the data comprises the edge alerts, and the alert is triggered based on the edge alerts.

6. The system of claim 1, wherein the instructions, when executed by the at least one processor, cause the at least one computing device to at least:
identify at least one action based on the alert, the at least one action comprising a command for at least one of the edge devices; and
transmit, to the at least one of the edge devices, a command to perform the at least one action.

7. The system of claim 1, wherein the instructions, when executed by the at least one processor, cause the at least one computing device to at least:
identify at least one action based on the alert, the at least one action comprising a command for at least one of the plurality of IoT devices; and
transmit, to the at least one of the plurality of IoT devices, a command to perform the at least one action.

8. A method, comprising:
receiving, by a fog evaluation service executed by at least one fog device of a local or private fog layer of a hybrid Internet-of-Things (IoT) evaluation framework, a multi-edge alert definition that specifies a plurality of IoT devices that communicate through a plurality of edge devices;
registering the multi-edge alert definition in the fog evaluation service for evaluation;
receiving, by the fog evaluation service from the plurality of edge devices, data corresponding to the plurality of IoT devices;
triggering, by the fog evaluation service, an alert based on a condition specified in the multi-edge alert definition being met based on the data corresponding to the plurality of IoT devices; and
transmitting, from the fog evaluation service to a cloud evaluation service of a cloud layer of the hybrid IoT evaluation framework, an indication that the alert is triggered.

9. The method of claim 8, further comprising:
receiving, from individual ones of the plurality of edge devices, IoT data relayed from individual ones of the plurality of IoT devices, wherein the data comprises the IoT data, and the alert is triggered based on the IoT data.

10. The method of claim 8, further comprising:
decomposing the multi-edge alert definition into a plurality of individual edge alert sub-definitions resolvable by individual ones of the plurality of edge devices; and
transmitting the plurality of individual edge alert definitions from the fog evaluation service to the individual ones of the plurality of edge devices.

11. The method of claim 10, further comprising:
creating a mapping of the individual edge alert sub-definitions for the multi-edge alert definition; and
maintaining a status for the individual edge alert sub-definitions for the multi-edge alert definition.

12. The method of claim 10, further comprising:
receiving, from the individual ones of the plurality of edge devices, edge alerts corresponding to the plurality of individual edge alert definitions, wherein the data comprises the edge alerts, and the alert is triggered based on the edge alerts.

13. The method of claim 8, further comprising:
identifying at least one action based on the alert, the at least one action comprising a command for at least one of the edge devices or at least one of the plurality of IoT devices; and
transmitting, to the at least one of the edge devices or the at least one of the plurality of IoT devices, a command to perform the at least one action.

14. The method of claim 8, further comprising:
identifying at least one action based on the alert, the at least one action comprising a command for at least one of the plurality of IoT devices; and
transmitting, to the at least one of the plurality of IoT devices, a command to perform the at least one action.

15. A non-transitory computer-readable medium comprising program instructions that when executed by at least one processor, cause at least one computing device to at least:
receive, by a fog evaluation service executed by at least one fog device of a local or private fog layer of a hybrid Internet-of-Things (IoT) evaluation framework, a multi-edge alert definition that specifies a plurality of IoT devices that communicate through a plurality of edge devices;
register the multi-edge alert definition in the fog evaluation service for evaluation;
receive, by the fog evaluation service from the plurality of edge devices, data corresponding to the plurality of IoT devices;
trigger, by the fog evaluation service, an alert based on a condition specified in the multi-edge alert definition being met based on the data corresponding to the plurality of IoT devices; and
transmit, from the fog evaluation service to a cloud evaluation service of a cloud layer of the hybrid IoT evaluation framework, an indication that the alert is triggered.

16. The non-transitory computer-readable medium of claim 15, wherein the instructions, when executed by the at least one processor, cause the at least one computing device to at least:
receive, from individual ones of the plurality of edge devices, IoT data relayed from individual ones of the plurality of IoT devices, wherein the data comprises the IoT data, and the alert is triggered based on the IoT data.

17. The non-transitory computer-readable medium of claim 15, wherein the instructions, when executed by the at least one processor, cause the at least one computing device to at least:
decompose the multi-edge alert definition into a plurality of individual edge alert sub-definitions resolvable by individual ones of the plurality of edge devices; and
transmit the plurality of individual edge alert definitions from the fog evaluation service to the individual ones of the plurality of edge devices.

18. The non-transitory computer-readable medium of claim 17, wherein the instructions, when executed by the at least one processor, cause the at least one computing device to at least:
create a mapping of the individual edge alert sub-definitions for the multi-edge alert definition; and
maintain a status for the individual edge alert sub-definitions for the multi-edge alert definition.

19. The non-transitory computer-readable medium of claim 17, wherein the instructions, when executed by the at least one processor, cause the at least one computing device to at least:
  receive, from the individual ones of the plurality of edge devices, edge alerts corresponding to the plurality of individual edge alert definitions, wherein the data comprises the edge alerts, and the alert is triggered based on the edge alerts.

20. The non-transitory computer-readable medium of claim 15, wherein the instructions, when executed by the at least one processor, cause the at least one computing device to at least:
  identify at least one action based on the alert, the at least one action comprising a command for at least one of the edge devices or at least one of the plurality of IoT devices; and
  transmit, to the at least one of the edge devices or the at least one of the plurality of IoT devices, a command to perform the at least one action.

\* \* \* \* \*